(12) United States Patent
Fischer

(10) Patent No.: US 11,513,536 B2
(45) Date of Patent: Nov. 29, 2022

(54) OPERATION OF A TETHERED DRONE

(71) Applicant: T-Mobile USA, Inc., Bellevue, WA (US)

(72) Inventor: Steve Fischer, Fort Collins, CO (US)

(73) Assignee: T-MOBILE USA, INC., Bellevue, WA (US)

(*) Notice: Subject to any disclaimer, the term of this patent is extended or adjusted under 35 U.S.C. 154(b) by 704 days.

(21) Appl. No.: 16/370,270

(22) Filed: Mar. 29, 2019

(65) Prior Publication Data

US 2020/0310466 A1 Oct. 1, 2020

(51) Int. Cl.
*G05D 1/10* (2006.01)
*B64C 39/02* (2006.01)
*B64F 1/36* (2017.01)

(52) U.S. Cl.
CPC ........... *G05D 1/101* (2013.01); *B64C 39/022* (2013.01); *B64C 39/024* (2013.01); *B64F 1/362* (2013.01); *B64C 2201/18* (2013.01)

(58) Field of Classification Search
CPC ........... B64C 39/022; B64C 2201/027; B64C 2201/122; B64C 2201/18; G05D 1/102
USPC ................................................. 244/175, 177
See application file for complete search history.

(56) References Cited

U.S. PATENT DOCUMENTS

| 9,836,049 | B1* | 12/2017 | Tu | B64C 39/022 |
| 10,507,914 | B2* | 12/2019 | Walker | H02G 11/02 |
| 2007/0200027 | A1* | 8/2007 | Johnson | B64C 39/022 |
| | | | | 244/3.1 |
| 2015/0097086 | A1* | 4/2015 | Schaefer | G05D 1/0866 |
| | | | | 244/175 |
| 2015/0304869 | A1* | 10/2015 | Johnson | G05D 1/0011 |
| | | | | 455/67.11 |
| 2017/0008626 | A1* | 1/2017 | Walker | B64F 3/00 |
| 2017/0295609 | A1* | 10/2017 | Darrow | H04W 84/18 |
| 2018/0009526 | A1* | 1/2018 | Spengler | H04B 7/0617 |
| 2018/0191439 | A1* | 7/2018 | Morser | H04B 10/801 |
| 2018/0319495 | A1* | 11/2018 | Tu | G05D 1/0011 |
| 2019/0055105 | A1* | 2/2019 | Benson | B65H 54/76 |
| 2020/0189731 | A1* | 6/2020 | Mistry | H04B 7/18502 |
| 2020/0218288 | A1* | 7/2020 | Johnson | G05D 1/0038 |
| 2020/0225684 | A1* | 7/2020 | Anderson | G05D 1/104 |

(Continued)

FOREIGN PATENT DOCUMENTS

| AU | 2020265530 A1 * | 11/2021 | ........... B64C 39/024 |
| CA | 3036779 A1 * | 9/2019 | ........... B64C 39/022 |
| CN | 109458881 A * | 3/2019 | ........... B64C 39/024 |

(Continued)

*Primary Examiner* — Christopher P Ellis
(74) *Attorney, Agent, or Firm* — Brownstein Hyatt Farber Schreck, LLP

(57) ABSTRACT

A drone may receive power from mobile base station equipment via an air-to-ground power feed during flight, which allows the drone to remain in flight for longer periods of time than relying on battery power alone. The air-to-ground power feed may be included in a tether that includes multiple air-to-ground power feeds or communication feeds. In some cases, the drone is powered by an on-board power system during takeoff and landing sequences to avoid damage to the tether or the drone and/or signal interference within the tether. In some cases, the drone may follow flight patterns during takeoff and landing sequences to avoid damage to the tether or the drone and/or signal interference within the tether.

17 Claims, 10 Drawing Sheets

(56) References Cited

U.S. PATENT DOCUMENTS

2020/0385115 A1* 12/2020 Piasecki ............. H04B 10/2575

FOREIGN PATENT DOCUMENTS

| | | | | |
|---|---|---|---|---|
| CN | 106560396 B | * | 11/2021 | ............. B63B 21/50 |
| DE | 102017004420 A1 | * | 11/2018 | |
| EP | 3035071 A2 | * | 6/2016 | ............... G01S 3/46 |
| GB | 2548369 A | * | 9/2017 | ................ B60P 3/11 |
| GB | 2560486 A | * | 9/2018 | ........... B64C 39/022 |
| WO | WO-2013156680 A1 | * | 10/2013 | ........... B64C 39/022 |
| WO | WO-2018002928 A1 | * | 1/2018 | ............. B64C 25/24 |
| WO | WO-2019067788 A1 | * | 4/2019 | ........... B64C 39/024 |
| WO | WO-2019105857 A1 | * | 6/2019 | ........... B64C 39/022 |

* cited by examiner

OPERATION OF A TETHERED DRONE

FIELD

Embodiments described herein relate to unmanned aerial vehicle systems, and in particular, to drone systems having features as described herein.

BACKGROUND

Electronic communication devices are commonplace in today's society. Examples of electronic communication devices (or UEs) include mobile phones, tablet computers, laptop computers, electronic watches, and other types of devices that are capable of communicating with each other, with web servers, or with equipment connected to various types of networks. Communications with a UE may be carried over a variety of wired or wireless networks, including circuit-switched networks (typically voice networks) and packet-switched networks (typically data networks). In some cases, a radio access network may connect a UE to a core network managed by a particular mobile carrier (e.g., a cellular service provider), or to various circuit-switched and/or packet-switched networks operated by the mobile carrier, other mobile carriers, or other service providers.

A radio access network may include, for example, a number of base station transceivers. A base station transceiver may establish and maintain wired or satellite communication links with core, circuit-switched, or packet-switched networks, and may establish wireless communication links with multiple UEs. A set of one or more base station transceivers (e.g., three base station transceivers) mounted on a tower and positioned to provide radio access for UEs within an angular extent about the tower (and in some cases, within an angular extent of 360° about the tower) may define a cell of a radio access network. When a cell is defined by multiple base station transceivers, each base station transceiver within the cell may define a sector of the cell. Alternatively, each sector may be considered a cell. As a UE moves from one cell to another cell, the UE's network connection(s) may be transferred (e.g., handed off) from a base station transceiver in one cell to a base station transceiver in another cell.

When a base station transceiver becomes inoperable for an extended period of time, such as when a natural disaster compromises the base station transceiver (or the tower on which it is mounted, the equipment cabinet that connects the base station transceiver to a backhaul network, or the power or backhaul network that provides service to the equipment cabinet), the UEs of users entering the cell served by the inoperable base station transceiver may be unable to connect to other UEs or networks, and the users may perceive a network outage. To temporarily restore network access, an operator of a radio access network may deploy mobile communication equipment that provides temporary service for the cell (e.g., service for a number of days or weeks). Such mobile communication equipment may include, for example, an electrical power generator, a base station transceiver, and a temporary tower on which the base station transceiver is mounted. The mobile telecommunication equipment may also include other types of equipment. The base station transceiver may connect to a ground-based satellite dish, or to a cable or fiber optic communication system, that connects that base station transceiver to a backhaul network.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

The devices, methods and systems described herein include drones or other unmanned aerial vehicles (UAVs), on-board power systems for a drone and/or a base station transceiver carried by a drone, and tethers or cables that may connect a power system or base station transceiver carried by a drone to a ground-based power delivery system and/or communication system. Also described are methods of powering and operating a drone that carries a base station transceiver.

The drones described herein may be configured to connect UEs to various communication networks, including radio access networks. For example, a drone may fly or hover at an altitude that enables UEs to communicate with a base station transceiver carried by the drone, and a tether connected to the drone may connect power and communication systems of the drone to ground-based power delivery and communication systems.

More specifically, a drone is described herein. The drone may include a propulsion system, a base station transceiver, an on-board power system, and an avionics system. The on-board power system may have a battery and be configured to receive power over an air-to-ground power feed. The avionics system may be configured to cause the on-board power system to power the propulsion system using the battery during a takeoff sequence in which the drone is lifted from a ground position to an in-air position and cause the power system to charge the battery using the base power system via the air-to-ground power feed after the drone is lifted to the in-air position.

Also described is a drone system. The drone system may include a base power system and a base processing unit. The base power system may be configured to provide power to a drone via an air-to-ground power feed. The base processing unit may be configured to cause a propulsion system of the drone to receive first power from a battery of the drone during a takeoff sequence in which the drone is lifted from a ground position to an in-air position and cause the propulsion system of the drone to receive second power from the base power system via the air-to-ground power feed during a flight sequence.

A method for operating a tethered drone is also described. The method may include performing, by a propulsion system of the tethered drone, a takeoff sequence in which the drone is lifted from a ground position to an in-air position; powering the propulsion system to perform the takeoff sequence using one or more batteries of the tethered drone; and powering the propulsion system after the takeoff sequence using a base power system electrically coupled to the drone by a tether.

BRIEF DESCRIPTION OF THE DRAWINGS

The disclosure will be readily understood by the following detailed description in conjunction with the accompanying drawings, wherein like reference numerals designate like structural elements.

The use of the same or similar reference numerals in different figures indicates similar, related, or identical items.

Figure 1:
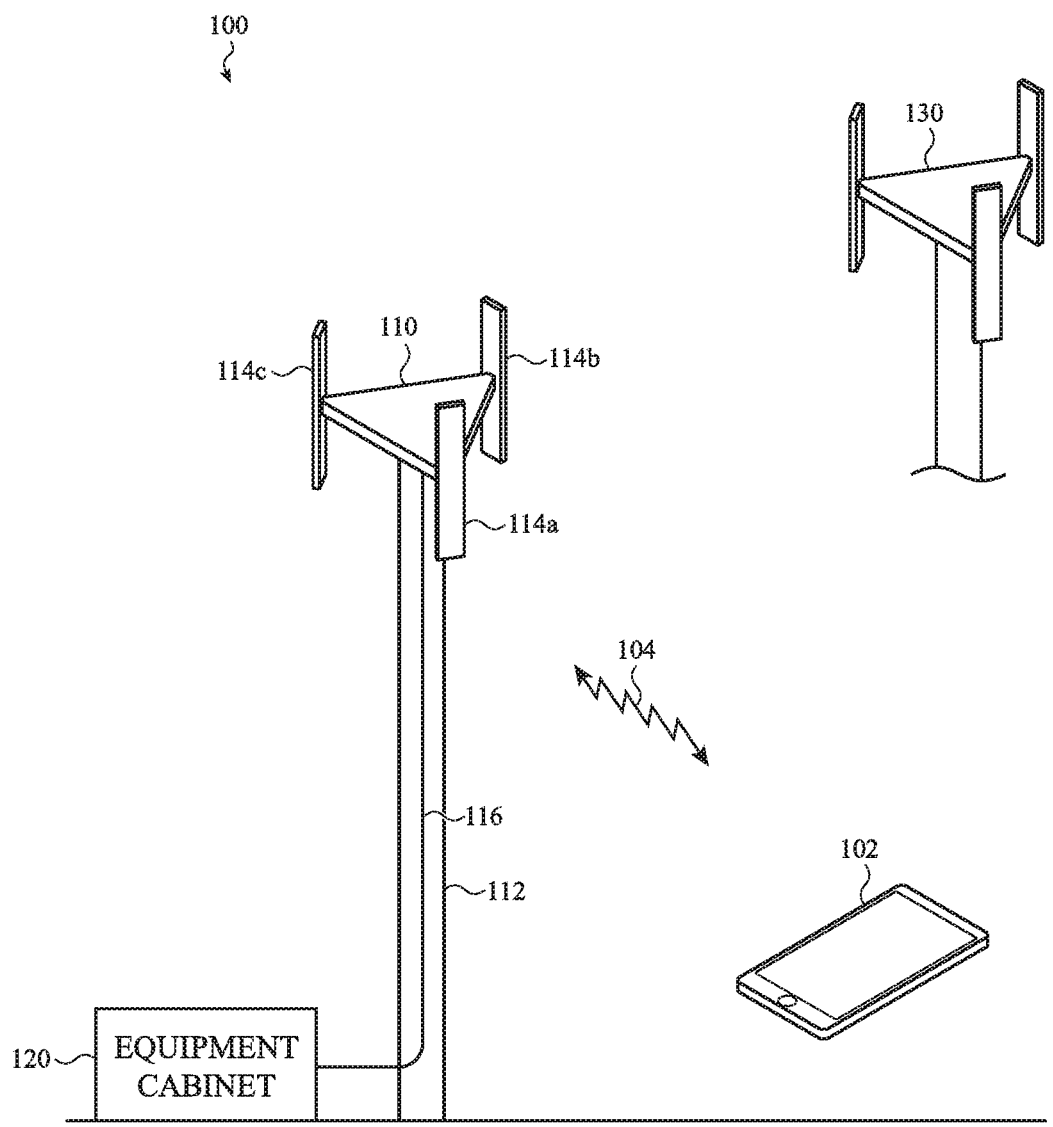
FIG. 1 illustrates a selection of components in an exemplary communication network.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the claims.

Cellular communication networks provide the ability for users to communicate with others, including loved ones, emergency service providers, and to access data services, including the internet, from nearly any location at any time. Many users expect that a cellular communication network will be available at all times. A failure of even a portion of a cellular communication network for a short time not only inconveniences and frustrates users, but also puts users' health and safety at risk by cutting off communication with emergency service providers and other important contacts.

In some cases, equipment failure caused by natural disasters or other events may cause portions of a cellular communication network to fail. For example, a damaged or otherwise inoperable base station transceiver may result in users in the area near the base station transceiver being unable to connect to the cellular communication network. Depending on the severity of damage to cellular communication equipment and surrounding infrastructure, downtime may range from minutes or hours to weeks or months. In addition, cell towers upon which many base station transceivers are placed are typically 50 to 200 feet in height to facilitate antenna coverage, so providing a fixed structure to temporarily replace a damaged cell tower is impractical in many situations.

Some of the embodiments described herein are directed to devices, methods, and systems that may be used as part of a communication network (e.g., a radio access network). The communication network may operate to provide communication services to UEs. Examples of such services include voice, data, video, radio, television, and other communications sent electronically, either through physical or wired connections, or wirelessly using electromagnetic radiation (e.g., radio frequency (RF) electromagnetic radiation). Examples of UEs include mobile phones, tablet computers, laptop computers, electronic watches, and other types of devices that are capable of communicating with each other, with web servers, or with equipment connected to various types of networks.

Some of the embodiments described herein are directed to devices, methods, and systems that may be used to power drones, and equipment that is on-board a drone.

Some of the embodiments described herein pertain to mobile communication equipment that can restore network access (e.g., UE access to a radio access network) when a base station transceiver of the radio access network is temporarily unavailable, as may be the case when a natural disaster (e.g., a hurricane, tornado, tsunami, flood, or fire) knocks out the base station transceiver, the tower on which it is mounted, the equipment cabinet that connects the base station transceiver to a backhaul or power source, and so on.

The drone systems described herein include various features to facilitate deployment as a subsystem of a communication network, for example to provide communication functionality while failed equipment (e.g., a base station transceiver) is repaired or replaced. In some cases, a drone system includes a drone coupled to mobile base station equipment (MBSE) on the ground using an air-to-ground tether. The drone may include one or more antennas for facilitating communication with communication devices, including cellular phones, and the MBSE may include a base communication system that communicably couples the antenna(s), and therefore the communication devices, to the broader communication network. When in flight, the drone may function similarly to a cell tower with a base station transceiver by providing communication functionality.

The air-to-ground tether may physically connect the drone to the MBSE to provide one or more signal paths for power signals and/or communication signals (e.g., control signals or communication network signals) to pass between the MBSE and the drone. In some cases, the air-to-ground tether may include multiple signal paths for providing multiple signals and/or for redundancy of one or more signals.

In some cases, the drone may receive power from the MBSE via the air-to-ground tether during flight, which allows the drone to remain in flight for longer periods of time than relying on battery power alone. This may allow the drone system to provide cellular communication functionality for extended periods of time without the need to interrupt service to recharge or replace batteries. In some cases, the drone is powered by onboard batteries during takeoff and landing sequences to avoid crosstalk or other signal interference or degradation within the air-to-ground tether, such as when the air-to-ground tether includes multiple distinct signal paths.

In some cases, the MBSE may provide control signals to the drone via the air-to-ground tether or another communication link (e.g., a wireless communication link). The control signals may include flight control signals, power management signals, and the like.

In various embodiments, the air-to-ground tether restrains movement of the drone relative to the MBSE. For example, the air-to-ground tether may prevent the drone from traveling beyond a certain distance from the MBSE.

These and other embodiments are discussed below with reference to FIGS. 1-9B. However, those skilled in the art will readily appreciate that the detailed description given herein with respect to these figures is for explanatory purposes only and should not be construed as limiting.

FIG. 1 illustrates a selection of components in an exemplary communication network 100. By way of example, the communication network 100 is shown to be a cellular communication network, but the devices, methods, and systems described herein can be used in other types of communication networks.

The communication equipment included in the communication network 100 may include base stations 110, 130 and UEs 102. The base stations 110, 130 and UEs 102 may communicate via wireless communication links 104, and the base stations 110, 130 may transmit communications between the UEs 102 and one or more communication networks (e.g., a core network of a mobile carrier, a circuit-switched network (e.g., a voice network, which in some cases may carry data, such as text messages) or a packet-switched network (e.g., a data network, which in some cases may carry voice communications, such as voice-over-IP (VoIP) communications)). For purposes of this description, a base station is intended to include a base transceiver station (BTS), a Node B, an evolved Node B (eNB), or any other type of equipment installed at the edge of a radio access network for the purpose of communicating with UEs 102.

An example UE 102 is illustrated as a mobile phone, but may alternatively be any other type of electronic communication device that is capable of communicating over a wireless communication link, such as a tablet computer, laptop computer, electronic watch, and so on. While only one UE 102 is shown in FIG. 1, one or many UEs 102 (or no UEs 102) may communicate with each of the base stations 110, 130 shown in FIG. 1.

The wireless communication link 104 may be established using any one or more of a number of radio access technologies (RATs), including, for example, Bluetooth, Wi-Fi, Global System for Mobile communications (GSM), Universal Mobile Telecommunications System (UMTS), Long-Term Evolution (LTE), or 5G new radio (5G NR) RATs.

The wireless communication link 104 may allow one or both of reception and transmission of communication by the UE 102. For example, a mobile phone may both transmit and receive, whereas a remote sensor (e.g., a weather beacon or tracking device) may in some cases only transmit, and a broadcast device (e.g., a billboard) may in some cases only receive.

By way of example, two base stations 110, 130 of the communication network 100 are shown. Each base station 110, 130 may include a tower 112 that supports one or more antennas 114a, 114b, 114c and associated base station transceivers (e.g., radios that transmit and receive using the antennas 114a, 114b, 114c). The base station transceivers may be connected to equipment stored within an equipment cabinet 120 at the base of a tower 112. The equipment stored within the equipment cabinet 120 may include baseband switching equipment, signal filtering and conditioning equipment (e.g., power amplifiers, modulators, digital signal processing equipment, analog-to-digital converters, and so on), an electrical power supply (e.g., a battery) or power grid connection, and so on. An electrical power generator may also be located in or near the equipment cabinet 120. The base station transceivers may be connected to the equipment within the equipment cabinet 120 by one or more power feeds (e.g., a set of redundant power feeds) and one or more communication channels (e.g., one or more copper, fiber, or fiber optic lines or cables) contained within one or more cables 116. In some embodiments, the cable(s) 116 may include one or more hybrid cables, which each contain both power feeds and communication channels.

In the example shown, the UE 102 may establish the wireless communication link 104 with an antenna 114 that provides the best signal strength for the UE 102 or base station 110, or may establish multiple wireless communication links with the UE 102, using one or more antennas 114 on one or both of the base stations 110, 130. Alternatively, the communication network 100 may determine which base station 110, 130 is allowed to communicate with the UE 102. The antenna 114 (and associated base station transceiver) that the UE 102 communicates with may also be determined by other means, or based on other parameters.

As previously mentioned, the equipment cabinet 120 may include various components for supporting the components (e.g., base station transceivers and antennas 114) installed on top of, or otherwise mounted on, the tower 112. The components within the equipment cabinet 120 may also transmit communications between the base station transceivers and antennas 114 on the tower 112 and a backhaul network. A connection to the backhaul network may include copper (coax), fiber, fiber optic cables, or a satellite connection. The connection to the backhaul enables the UE 102 to communicate with other UEs, web servers, or other equipment connected to various types of networks.

Figure 2:
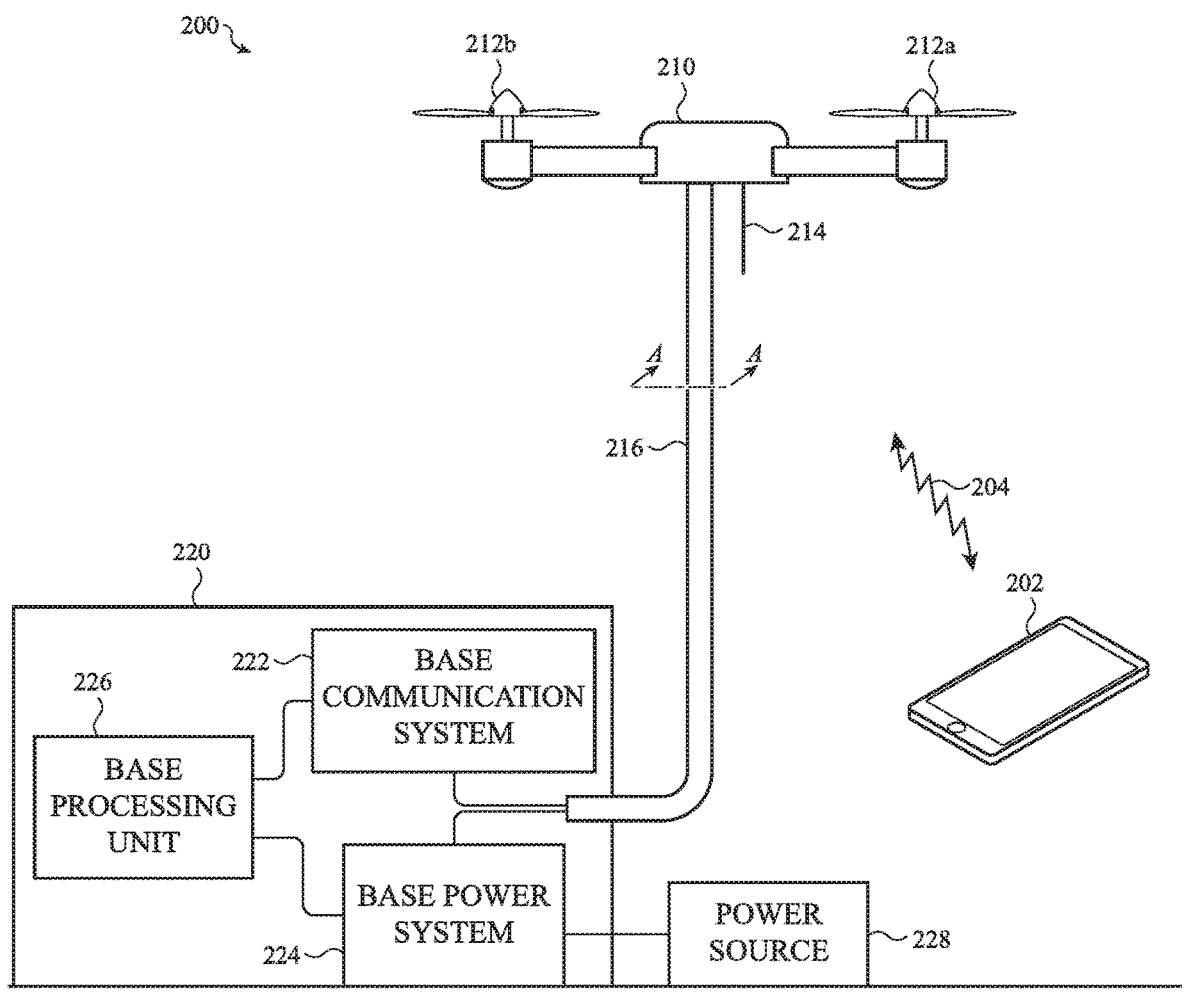
FIG. 2 illustrates exemplary mobile communication equipment that may be used to temporarily replace one of the base stations described with reference to FIG. 1.

FIG. 2 illustrates exemplary mobile communication equipment 200 that may be used to temporarily replace one of the base stations described with reference to FIG. 1. For example, in the event that a base station becomes inoperable due to a natural disaster, the mobile communication equipment 200 may be deployed at or near a location of the inoperable base station (or elsewhere), and be operated as a substitute for the inoperable base station, so that UEs do not perceive a network outage. Alternatively, the mobile communication equipment 200 may be used in addition to the base stations described with reference to FIG. 1.

The mobile communication equipment 200 may include a drone 210 that is configured to fly or hover over or near ground-based mobile base station equipment (MBSE) 220. The drone 210 may be connected to the MBSE 220 by a tether 216 (e.g., a cable). The tether 216 may restrain the drone (e.g., limit how high or far the drone 210 can move away from the MBSE 220). However, the primary purpose of the tether 216 is to supply the drone 210 with electrical power provided (and in some cases generated) by the MBSE 220. The tether 216 may include one or more power feeds therein for supplying such electrical power. In some cases, the tether 216 may include a set of redundant power feeds (e.g., six power feeds). The power feed(s) within the tether 216 may be connected between a power system of the drone 210 and a base power system 224 of the MBSE 220. The power feed(s) within the tether 216 may in some cases be referred to herein as air-to-ground power feeds.

The tether 216 may also include one or more data lines, signal lines, or other communication channels, which may carry different signals or data to improve the throughput of signal/data transfers through the tether 216, or carry the same or different versions of the same signals/data to improve the robustness (e.g., low error rate) of signal/data transfers through the tether 216. As described herein in relation to the tether 216, "data" may include signals or messages transmitted in circuit-switched or packet-switched networks, as well as various control signals transmitted outside of a network. The signal or data line(s) within the tether 216 may in some cases be connected between an avionics system or communication system (e.g., a base station transceiver) on-board the drone 210 and a base communication system 222 of the MBSE 220.

The drone 210 may include an on-board communication system (e.g., a base station transceiver, which may also be referred to as a mobile base station transceiver (or just a transceiver)). The communication system on-board the drone 210 may establish a wireless communication link 204 with a UE 202 (or establish wireless communication links with multiple UEs 202) and connect the UE 202 (or UEs) to a backhaul network via the base communication system 222 of the MBSE 220.

The drone 210 may include an antenna 214, such as whip antenna, which may be used to establish the wireless communication link 204 and transmit/receive communications (e.g., signals or data) to/from the UE 202. In alternative embodiments, the drone 210 may have a greater number of antennas, or different types of antennas. The antenna 214 may be connected to the base station transceiver on-board the drone 210.

The drone 210 may be a pilotless aircraft (e.g., a UAV). The drone 210 may operate semi-autonomously, using computer-implemented instructions stored in the drone's avionics system. Additionally and/or alternatively, the drone 210 may receive instructions from an operator over a communication link. Such a communication link between the drone 210 and an operator may be established over a communication channel within the tether 216, or over a wireless communication link.

The drone 210 may fly or hover using a set of propellers, including propellers 212a and 212b. While only two propellers are shown in FIG. 2's elevation of the drone 210, the drone 210 may have four, six, eight, or any number of propellers. Alternatively, a drone may have a single central propeller. The propellers 212a, 212b may be powered by electrical power received over one or more power feeds included in the tether 216, or by a battery on-board the drone 210.

The MBSE 220 may be transportable by a vehicle (not shown) to a location where the drone 210 is launched. The MBSE 220 may receive power from a power source 228, such as an electrical power generator or electrical power grid. The power source 228 may be a mobile power source included as part of the MBSE 220, or a separate component or structure.

The MBSE 220 may include a base power system 224 that receives power, such as electrical power, provided by the power source 228. The base power system 224 may provide AC-to-DC conversion, DC-to-DC conversion, electrical power filtering and conditioning, and/or other functions to provide appropriate electrical powering of other components of the MBSE 220. The base power system 224 may also provide electrical power to the drone 210, through the tether 216.

The MBSE 220 may further include a base processing unit 226 (e.g., a discrete or distributed processor, a microprocessor, a microcontroller, a central processing unit (CPU), a peripheral interface controller (PIC), an application-specific integrated circuit (ASIC), a field programmable gate array (FPGA), or another form of processing unit), which may control and coordinate the operations and functions of the MBSE 220. In some cases, the base processing unit 226 may include control and/or computational components and/or circuits, such as automated control units, or analog or digital signal processing components. Together, the power source 228 and the MBSE 220 may be referred to herein as a power delivery system.

The MBSE 220 may also contain a base communication system 222, which may connect with a backhaul network. The base communication system 222 may transmit communications received from the backhaul network to the drone 210, over communication channels within the tether 216. The drone 210 may then transmit corresponding communications to the UE 202, over the wireless communication link 204. Additionally, the base communication system 222 may receive communications from the drone 210, over communication channels within the tether 216, and transmit corresponding communications over the backhaul network. In this manner, the base communication system 222 may provide the UE 202 with transmit and receive channels over the backhaul network. UEs 202 may communicate over the backhaul network, through the drone 210 and MBSE 220, while the drone 210 is connected to the MBSE 220 via the tether 216.

Figure 3:
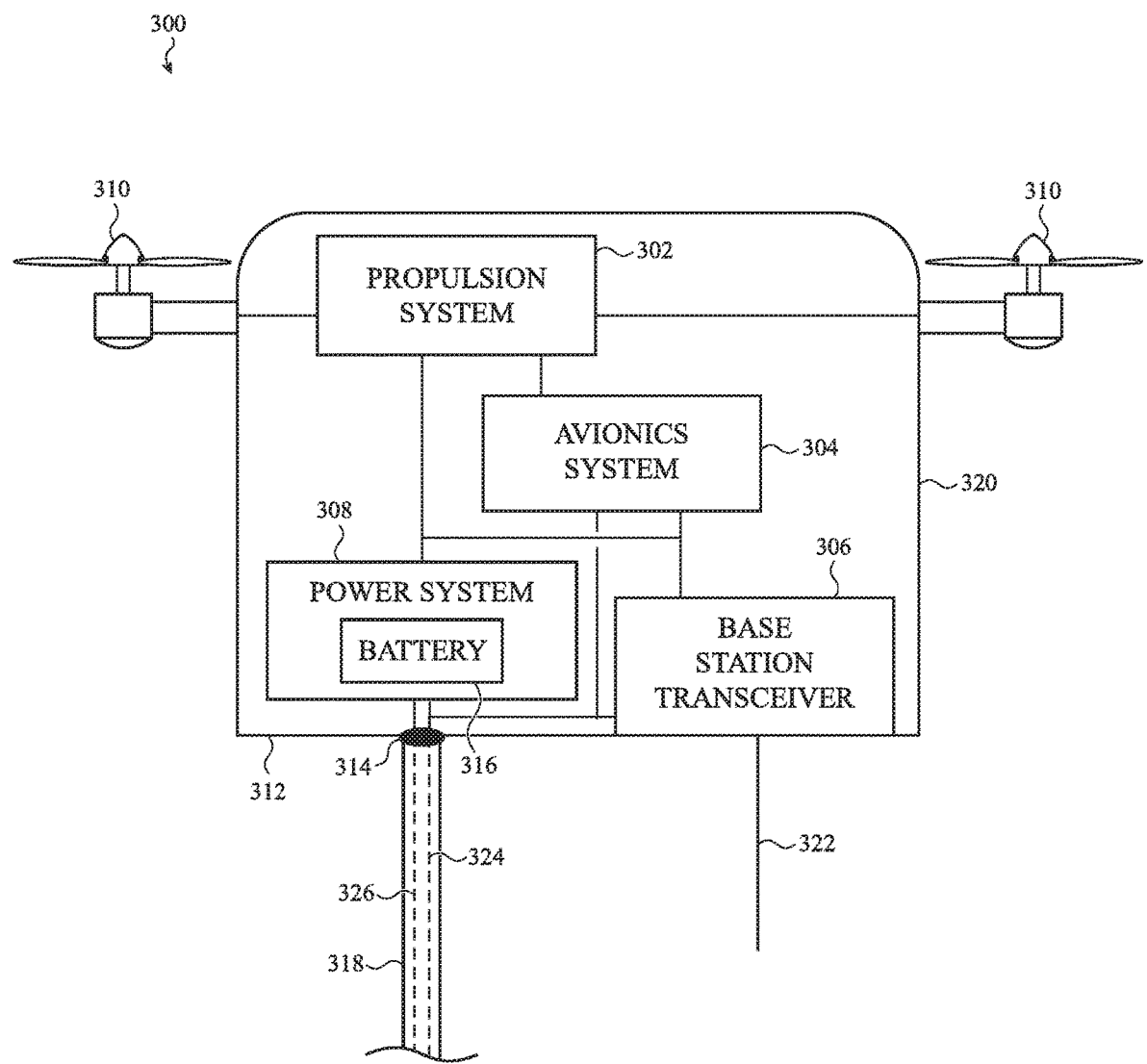
FIG. 3 shows an example block diagram of a drone.

FIG. 3 shows an example block diagram of a drone 300. The drone 300 is an example of the drone described with reference to FIG. 2. The drone 300 may include a propulsion system 302, an avionics system 304, a base station transceiver 306, and a power system 308. The propulsion system 302, avionics system 304, base station transceiver 306, and power system 308 may be mounted to a housing 320 (e.g., a drone housing), and each component or system may be positioned internal to the housing 320, external to the housing 320, or such that the component or system extends through the housing 320 and is partially positioned within the housing 320 and partially positioned external to the housing 320.

The propulsion system 302 may include a set of one or more propellers 310. Each propeller 310 may be configured to rotate substantially horizontally to a base 312 of the drone 300. The propeller(s) 310 may rotate around one or more axes, which axes may typically be oriented perpendicular to the base 312. The base 312 may be a plane defined by a set of feet or a bottom of the drone 300. For purposes of this description, propellers 310 that rotate substantially horizontally to the base 312 begin rotation in a plane horizontal to the base 312 upon power up, and end rotation in the plane upon power down. Propellers 310 that rotate substantially horizontal to the base 312 also rotate horizontal to the base 312 when the drone 300 is ascending or descending vertically under ideal conditions (e.g., no wind currents), and when the drone 300 is maintaining a steady-state in-air position under ideal conditions. In some cases, the axis or axes around which the propellers 310 rotate may be fixed, such that the propeller(s) always rotate horizontal to the base 312. In other cases, the axis or axes around which the propellers 310 rotate may tilt, in the same or different directions. In these latter cases, the axis or axes may be tilted to steer the drone 300. When the axis or axes do not tilt, the drone 300 may be steered by changing the speed of rotation of different propellers 310, by adjusting the orientation of one or more rudders, and so on.

In some embodiments, the propulsion system 302 may include multiple propellers 310, with different propellers 310 rotating around different axes oriented at oblique angles with respect to the base 312.

The avionics system 304 may include a processor that controls the propulsion system 302 and/or power system 308. The avionics system 304 may include a navigation system, a signaling system (e.g., a system that activates one or more lights or audible alarms to alert persons or other devices to the presence or status of the drone 300), a camera, and so on.

The base station transceiver 306 may include one or more radios connected to one or more antennas 322 (e.g., one or more omnidirectional whip antennas, or one or more sector antennas providing cellular coverage for one or more sectors covering part or all of a 360 degree panoramic field of view). The base station transceiver 306 may communicate with user equipment (e.g., mobile phones and/or other devices) using the radio(s) and antenna(s) 322. The base station transceiver 306 may also include a physical interface (e.g., a wired, fiber, or optical interface) for connecting to a communication network (e.g., a backhaul network). The physical interface may connect to one or more wire, fiber, or fiber optic communication channels 324 included in a tether 318 connected to a tether connector 314, and ultimately to equipment (e.g., a base communication system) that is temporarily or semi-permanently located at a ground-based site (e.g., at the MBSE described with reference to FIG. 2). Also or alternatively, the base station transceiver 306 may include a wireless interface for connecting to a communication network (e.g., the backhaul network) wirelessly. The wireless interface may include, for example, an RF interface for connecting to equipment at a ground-based site (e.g., MBSE), on a satellite, or elsewhere. The base station transceiver 306 may be configured to transmit data between UEs and a communication network (in some cases, by transmitting or receiving signals or data through the tether 318).

The power system 308 may be configured to power the propulsion system 302, the avionics system 304, and the base station transceiver 306. The power system 308 may receive electrical power through the tether 318 (e.g., over one or more power feeds 326 (e.g., six redundant power feeds) included in the tether 318). The power system 308 may include a battery 316. The power system 308 may power the propulsion system 302, the avionics system 304, and/or the base station transceiver 306 using power from the battery 316. The power system 308 may be configured to charge the battery 316 while the drone 300 is connected to the tether 318, while the drone 300 is or is not in the air, and while the base station transceiver 306 is or is not providing cellular service (or other wireless service) for UEs.

As noted above, the drone 300 may be powered using power from one or more power feeds 326 and/or power from the battery 316. In some cases, the drone 300 may receive power from the one or more power feeds 326 and the battery 316 at the same time. In some cases, the drone 300 is powered using either the one or more power feeds 326 or the battery 316. For example, during takeoff and landing sequences, the drone 300 may receive power from the battery 316 and not from the one or more power feeds 326. Similarly, during flight sequences, the drone 300 may receive power from the one or more power feeds 326 and not from the battery 316.

The avionics system 304 may be configured to operate the propulsion system 302, to fly the drone 300, while the tether 318 is connected to the tether connector 314. Power may or may not be received by the power system 308, through the tether, while the avionics system 304 operates the propulsion system 302 to fly the drone 300. The power system 308 may power the propulsion system 302, the avionics system 304, and/or the base station transceiver 306 using power received from the base power system 224 via the tether 318. In various embodiments, the tether 318 may be the same tether as the tether 216 of FIG. 2.

The tether connector 314 may be a single physical connector, or may include a set of multiple connectors. In some cases, the tether connector 314 may consist of connectors for the power feeds 326 and communication channels 324. In other cases, the tether connector 314 may include connectors for the power feeds 326 and communication channels 324, in addition to a connector for a mechanical anchor (e.g., a braided steel cable) included within the tether 318. The tether connector 314, or components thereof, may be located on the drone's housing 320 as shown. Additionally or alternatively, the tether connector 314 or some of its components may be located internal to the housing 320, and in some cases may include an electrical connector of the power system 308 and/or a data connector of the avionics system 304 or base station transceiver 306.

For purposes of this description, the base station transceiver 306, or in some cases the base station transceiver 306 in combination with its antennas 322 and parts of the power system 308, or in some cases the drone 300 and all of its components and systems, may sometimes be referred to herein as a communication system.

As noted above, the power system 308 may power the propulsion system 302, the avionics system 304, and/or the base station transceiver 306 using power received over the air-to-ground power feeds (e.g., from the base power system 224) and/or using power received from the battery 316.

In various embodiments, the drone 300 (e.g., the avionics system 304 and the propulsion system 302) may perform various sequences as part of flying the drone 300. In some cases, the sequences include takeoff sequences to lift the drone from a ground position to an in-air position, flight sequences to maintain the drone in an in-air position or move the drone between in-air positions, and landing sequences to lower the drone to a landing position.

In some cases, one or more sequences performed by the drone 300 may cause signal interference, such as crosstalk, signal degradation, and the like, of signals transmitted via the air-to-ground power feeds. In some cases, different portions of the tether 318 may be brought closer or adjacent to one another as part of takeoff sequences or landing sequence, resulting in interference such as crosstalk between the multiple redundant power feeds and/or communication feeds of the tether. For example, the tether 318 may be contact or be positioned near itself (e.g., by being folded, coiled, or overlapping itself). In some cases, the tether 318 may be deformed (e.g., bent or twisted) as part of takeoff sequences or landing sequence, resulting in interference such as crosstalk between the multiple redundant power feeds and/or communication feeds of the tether.

Signal interference may inhibit power signals and/or communication signals from effectively passing between the MBSE and the drone 300. In some cases, the signal interference may cause an inability for the air-to-ground power feeds to provide a consistent source of power for the drone 300. If the avionics system and/or propulsion system are unable to receive enough power, the drone may crash or be otherwise negatively affected. In various embodiments, the drone 300 may be powered using the battery 316 during takeoff or landing sequences to mitigate or avoid the impacts of signal interference.

Figure 4:
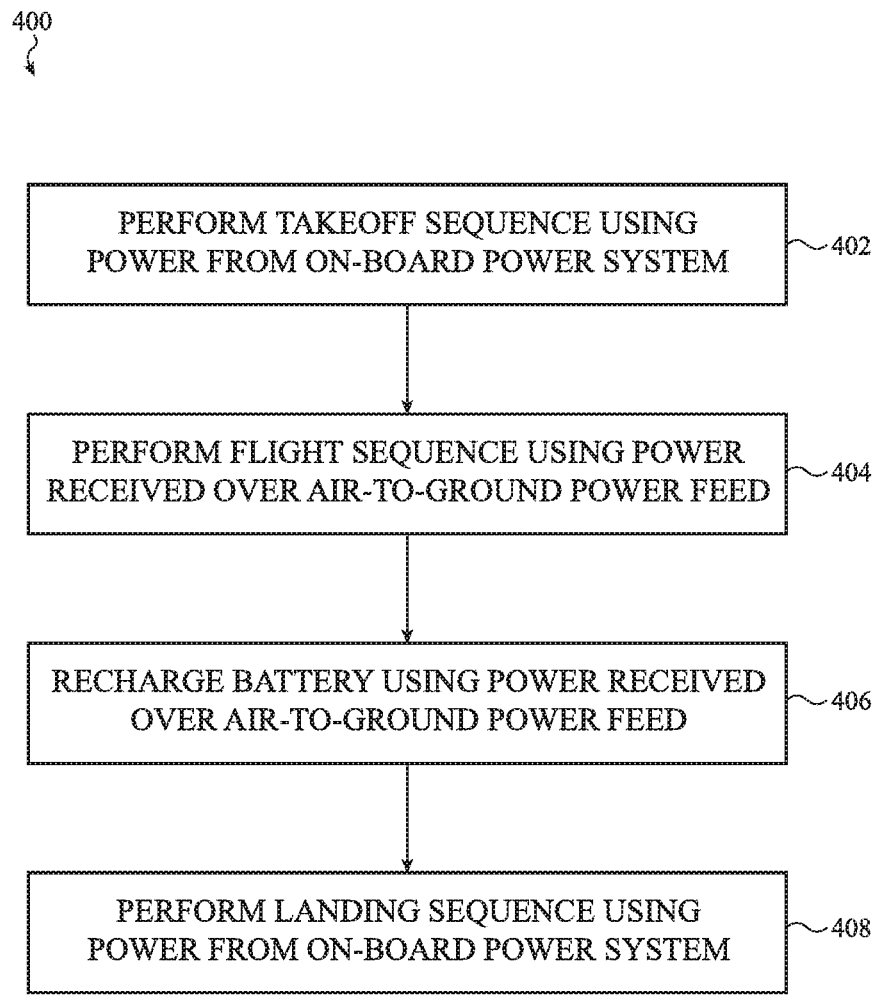
FIG. 4 shows an example method for powering a drone that carries a base station transceiver.

FIG. 4 shows an example method 400 for powering a drone that carries a base station transceiver.

At block 402, the method 400 includes performing a takeoff sequence of a drone using electrical power from an on-board power system (e.g., the power system 308). During the takeoff sequence, the drone may be lifted from a ground position to an in-air position. In some embodiments, the on-board power system powers the avionics system and/or propulsion system of the drone using one or more batteries (e.g., battery 316) of the on-board power system. As noted above, using the battery to power the drone during takeoff sequences may avoid situations in which signal interference of power signals being transmitted via a tether results in under-powered or inconsistently powered drone systems, such as the avionics system and/or the propulsion system. In some cases, the drone does not receive power from another source (e.g., an air-to-ground power feed) during the takeoff sequence.

At block 404, the method 400 includes performing a flight sequence using electrical power received over an air-to-ground power feed (e.g., a power feed in tether 318). The flight sequence may be performed after the drone is lifted to the in-air position during the takeoff sequence. During the flight sequence, the drone may maintain an in-air position and/or move between multiple in-air positions. In some embodiments, the electrical power may also be received over additional air-to-ground power feeds. For example, the electrical power may be received, in parallel, over a set of redundant air-to-ground power feeds (e.g., six air-to-ground power feeds). In further embodiments, the electrical power may be received over a power feed that is not necessarily an air-to-ground power feed. In some embodiments, the air-to-ground power feeds may be power feeds in the tether described with reference to FIG. 2 or 3. In some embodiments, the drone does not receive power from another source (e.g., a battery) during the flight sequence.

At block 406, the method 400 includes recharging a battery of the drone using electrical power received over an air-to-ground power feed. The battery may be recharged during the flight sequence and after the drone is lifted to the in-air position during the takeoff sequence. In some cases, the on-board power system may charge the battery. The battery may include multiple parallel-connected battery cells, and charging the battery may include balancing a charge across the battery cells. In various embodiments, the battery may be discharged when used for powering the drone (e.g., during a takeoff sequence), and it may be recharged during a flight sequence for subsequently powering the drone (e.g., during a landing sequence).

At block 408, the method include performing a landing sequence of a drone using electrical power from an on-board power system, (e.g., the power system 308). During the landing sequence, the drone may be lowered from an in-air position to a landing position. In some embodiments, the on-board power system powers the avionics system and/or propulsion system of the drone using one or more batteries (e.g., battery 316) of the on-board power system. As noted above, using the battery to power the drone during landing sequences may avoid situations in which signal interference of power signals being transmitted via a tether results in under-powered or inconsistently powered drone systems, such as the avionics system and/or the propulsion system. In some cases, the drone does not receive power from another source (e.g., an air-to-ground power feed) during the landing sequence.

Figure 5:
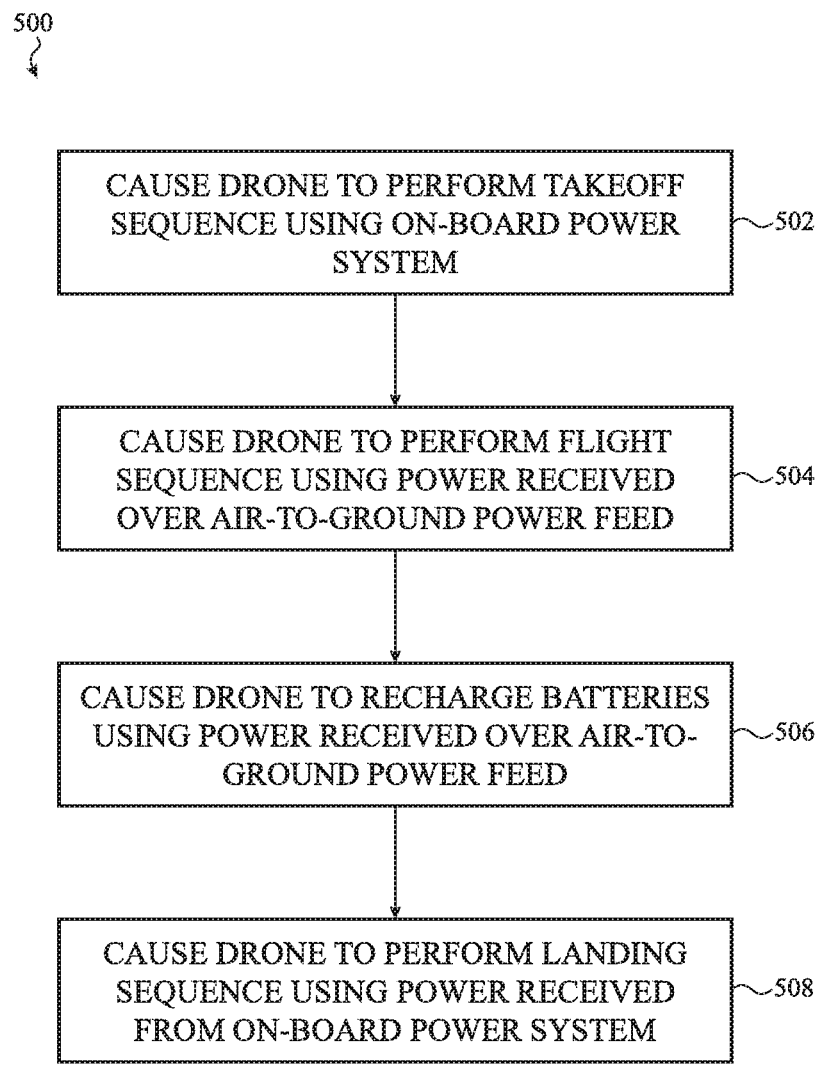
FIG. 5 shows a second example method for powering a drone that carries a base station transceiver.

FIG. 5 shows a second example method 500 for powering a drone that carries a base station transceiver.

At block 502, the method 500 includes causing a drone (e.g., drone 300) to perform a takeoff sequence using an on-board power system. (e.g., the power system 308). In some embodiments, the on-board power system powers the avionics system and/or propulsion system of the drone using one or more batteries (e.g., battery 316) of the on-board power system. As noted above, using the battery to power the drone during takeoff sequences may avoid situations in which signal interference of power signals being transmitted via a tether results in under-powered or inconsistently powered drone systems, such as the avionics system and/or the propulsion system. In some cases, the drone does not receive power from another source (e.g., an air-to-ground power feed) during the takeoff sequence.

In some cases, a MBSE (e.g., MBSE 220) may cause the drone to perform the takeoff sequence. For example, a base processing unit (e.g., base processing unit 226) and/or a base communication system (e.g., base communication system 222) may communicate with the propulsion system and/or avionics system of the drone and cause the propulsion system to perform the takeoff sequence. In some cases, the MBSE may cause the on-board power system to power the drone during the takeoff sequence. For example, the base processing unit and/or the base communication system may communicate with the on-board power system to cause the on-board power system to power the drone during the takeoff sequence.

At block 504, the method 500 includes causing the drone to perform a flight sequence using electrical power received over an air-to-ground power feed. In some embodiments, a base processing unit of the MBSE may cause the drone to perform the flight sequence. In some embodiments, a base power system of the MBSE may provide the electrical power to the drone via the air-to-ground power feed. In some embodiments, the electrical power may also be provided over additional air-to-ground power feeds. For example, the electrical power may be provided, in parallel, over a set of redundant air-to-ground power feeds (e.g., six air-to-ground power feeds). In further embodiments, the electrical power may be provided over a power feed that is not necessarily an air-to-ground power feed. In some embodiments, the air-to-ground power feeds may be power feeds in the tether described with reference to FIG. 2 or 3. In some embodiments, the drone does not receive power from another source (e.g., a battery) during the flight sequence.

At block 506, the method 500 includes causing the drone to recharge one or more batteries of the drone using electrical power received over an air-to-ground power feed. In some embodiments, a base processing unit of the MBSE may cause the drone to recharge its batteries using electrical power received via the air-to-ground power feed. In some cases, the on-board power system may charge the battery. In some cases, a base power system of the MBSE may charge the battery. The battery may include multiple parallel-connected battery cells, and charging the battery may include balancing a charge across the battery cells. In various embodiments, the battery may be discharged when used for powering the drone (e.g., during a takeoff sequence), and it may be recharged during a flight sequence for subsequently powering the drone (e.g., during a landing sequence).

At block 508, the method 500 includes causing the drone to perform a landing sequence using electrical power from the on-board power system. In some embodiments, the on-board power system powers the avionics system and/or propulsion system of the drone using one or more batteries (e.g., battery 316) of the on-board power system. As noted above, using the battery to power the drone during landing sequences may avoid situations in which signal interference of power signals being transmitted via a tether results in under-powered or inconsistently powered drone systems, such as the avionics system and/or the propulsion system. In some cases, the drone does not receive power from another source (e.g., an air-to-ground power feed) during the landing sequence.

In some cases, a MBSE (e.g., MBSE 220) may cause the drone to perform the landing sequence. For example, a base processing unit and/or a base communication system may communicate with the propulsion system and/or avionics system of the drone and cause the propulsion system to perform the landing sequence. In some cases, the MBSE may cause the on-board power system to power the drone during the landing sequence. For example, the base processing unit and/or the base communication system may communicate with the on-board power system to cause the on-board power system to power the drone during the landing sequence.

In various embodiments, certain steps of the methods 400 and 500 may be omitted or performed in different orders and/or simultaneously. In some cases, one or more steps from the method 400 may be combined with one or more steps from the method 500.

As noted above, in some cases, one or more sequences performed by the drones described herein may cause signal interference, such as crosstalk or signal degradation of signals transmitted via the air-to-ground power feed(s). Additionally, in some cases, one or more sequences performed by the drones herein may cause physical damage to the air-to-ground power feeds. For example, the tether may be damaged by a propeller or other part of a drone during takeoff or landing sequences. Likewise, the drone may be damaged by contacting the tether during takeoff or landing sequences. During typical flight sequences, the tether may be designed to have sufficient tension to keep the tether away from propellers and other parts of the drone that may damage the tether or the drone. However, in some cases, during takeoff or landing sequences, the tether may be positioned such that the tether or the drone may be damaged by coming into contact with one another.

In some cases, signal interference and/or damage to the tether or the drone may be mitigated or avoided by following particular flight patterns during takeoff or landing sequences. FIGS. 6A-9B show example flight patterns for a drone that carries a base station transceiver to mitigate or avoid signal interference and/or damage to the tether or the drone.

Figure 6A:
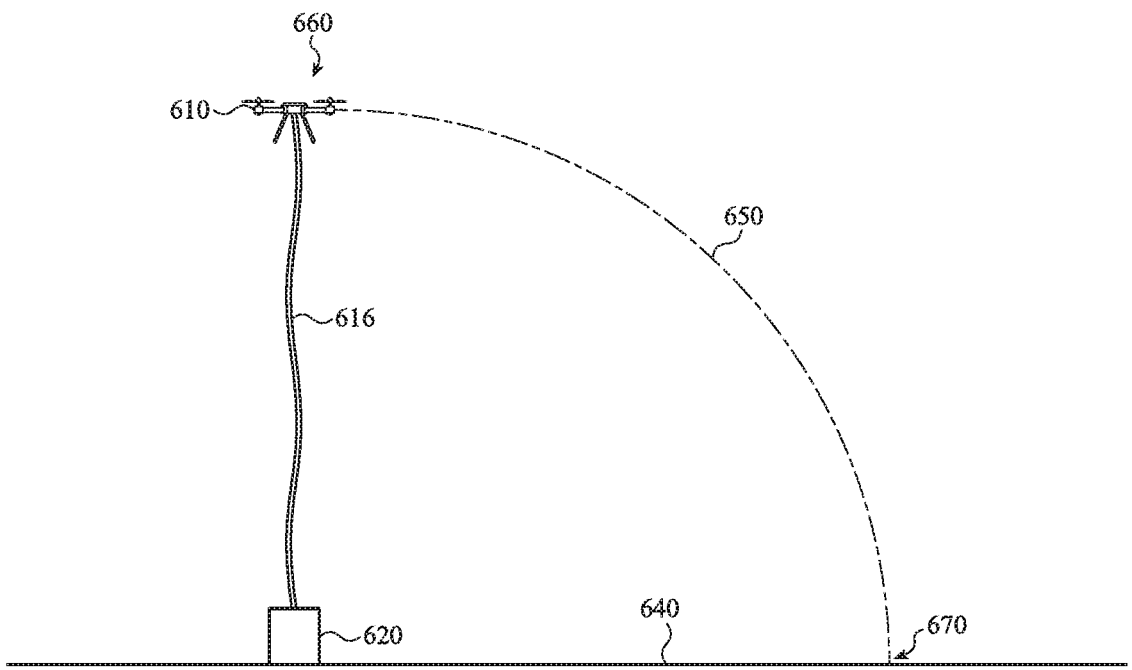
FIGS. 6A-9B show example flight patterns for a drone that carries a base station transceiver to mitigate or avoid signal interference and/or damage to the tether or the drone.
Figure 6B:
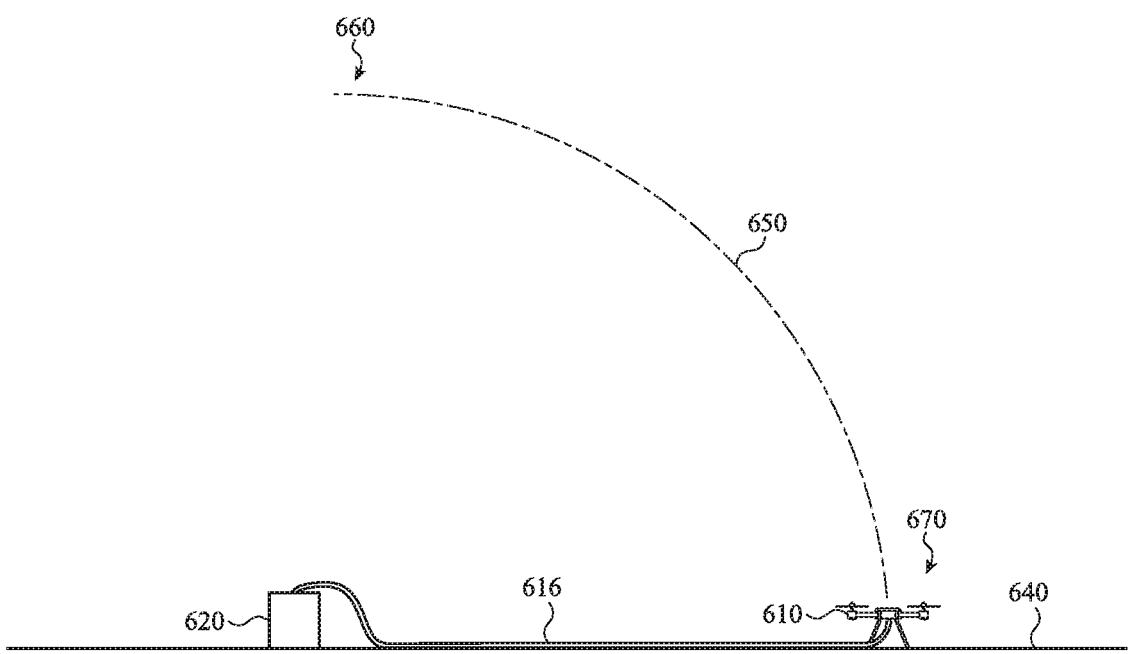

FIG. 6A illustrates a drone 610 at an in-air position 660 (e.g., in a flight sequence or at the beginning of a landing sequence). The drone 610 is connected to MBSE 620 via a tether 616. The drone 610, the MBSE 620, and the tether 616 may have the same or similar structure and functionality as other drones discussed herein (e.g., drone 300; MBSE 220; tethers 216, 318). As shown in FIGS. 6A-6B, the drone 610 may perform a landing sequence in which it follows a flight pattern 650 and is lowered to a landing position 670.

FIG. 6B illustrates the drone 610 at a landing position 670, for example at the conclusion of a landing sequence. In some cases the landing position 670 is on the ground 640, although the landing position may be on any suitable landing surface, including surfaces elevated or recessed with respect to ground level. During the landing sequence, the tether 616 may be laid down along the ground 640 or another landing surface.

In some cases, following the flight pattern 650 may prevent or mitigate portions of the tether 616 from contacting itself by avoiding folding, coiling, or overlapping the tether on itself. As shown in FIG. 6B, the flight pattern 650 and the landing position 670 may allow the tether 616 to remain extended and not overlap itself during the entire landing sequence. A distance between the MBSE and the landing position may be substantially the same as the length of the tether 616. For example, a distance between the MBSE and the landing position may be at least 90% of the length of the tether 616. As discussed above, this may prevent or mitigate crosstalk or other signal interference between power feeds or communication feeds in the tether 616. Similarly, in some cases, following the flight pattern 650 may allow the drone 610 to avoid contacting the tether during the landing sequence (besides at a connection point). As discussed above, this may avoid damage to the tether or the drone during the landing sequence.

Figure 7A:
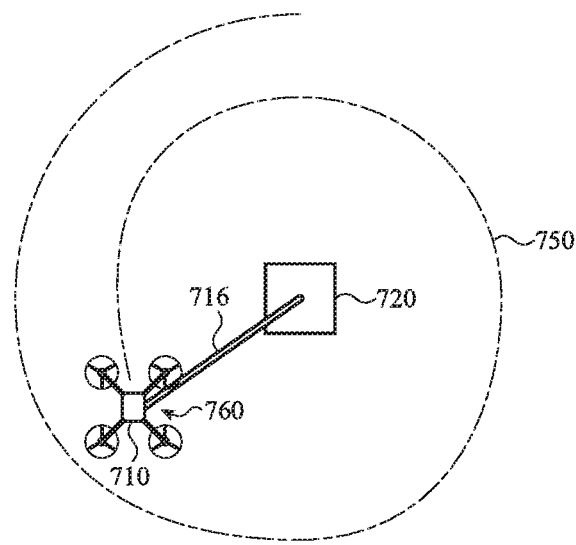
Figure 7B:
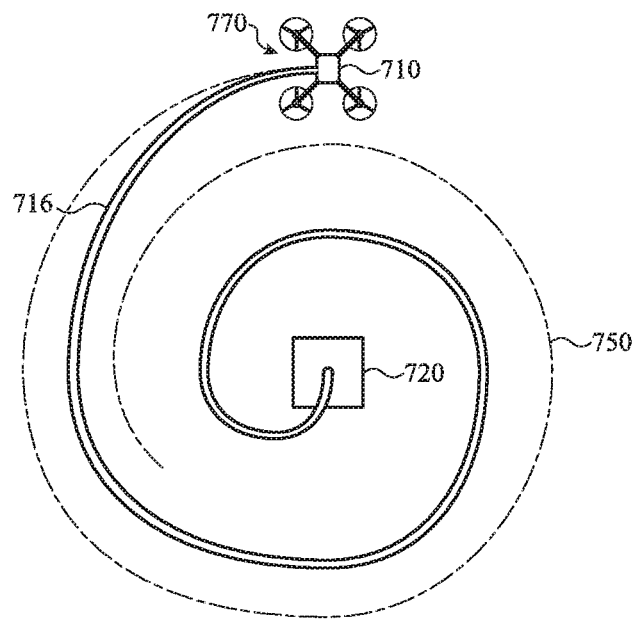

FIG. 7A illustrates a top view of a drone 710 at an in-air position 760 (e.g., in a flight sequence or at the beginning of a landing sequence). The drone 710 is connected to MBSE 720 via a tether 716. The drone 710, the MBSE 720, and the tether 716 may have the same or similar structure and functionality as other drones discussed herein (e.g., drones 300, 610; MBSE 220, 620; tethers 216, 318, 616). As shown in FIGS. 7A-7B, the drone 710 may perform a landing sequence in which it follows a flight pattern 750 and is lowered to a landing position 770.

FIG. 7B illustrates the drone 710 at a landing position 770, for example at the conclusion of a landing sequence. In some cases the landing position 770 is on the ground 740, although the landing position may be on any suitable landing surface, including surfaces elevated or recessed with respect to ground level. During the landing sequence, the tether 716 may be laid down along the ground 740 or another landing surface. As shown in FIGS. 7A-7B, the flight pattern 750 may be a helical flight pattern, which lays the tether 716 down in a (non-overlapping) spiral pattern on the ground 740 or landing surface.

In some cases, following the flight pattern 750 may prevent or mitigate portions of the tether 716 from contacting itself by avoiding folding, coiling, or overlapping the tether on itself. As shown in FIG. 7B, the flight pattern 750 and the landing position 770 may allow the tether 716 to not overlap itself during the entire landing sequence. As discussed above, this may prevent or mitigate crosstalk or other signal interference between power feeds or communication feeds in the tether 716. Similarly, in some cases, following the flight pattern 750 may allow the drone 710 to avoid contacting the tether during the landing sequence (besides at a connection point). As discussed above, this may avoid damage to the tether or the drone during the landing sequence. The helical flight pattern 750 and the spiral pattern of the tether 716 may allow the drone to land in a smaller area than other flight patterns, such as flight pattern 650, because the distance between the landing position 770 and the MBSE 720 may be significantly less than the length of the tether 716. For example, the distance between the landing position 770 and the MBSE 720 may be less than one-third of the length of the tether 716.

Figure 8A:
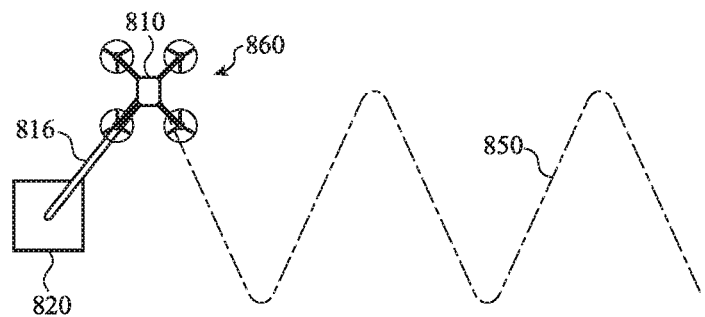
Figure 8B:
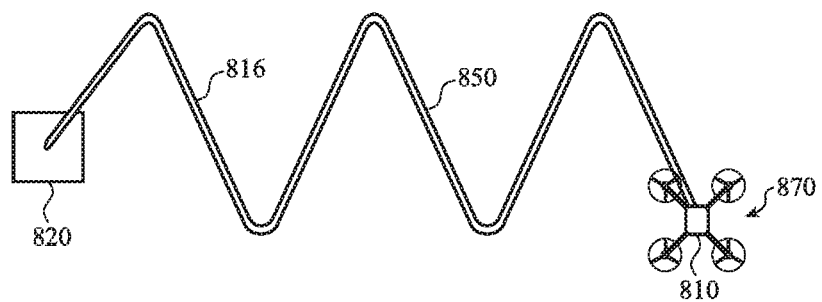

FIG. 8A illustrates a top view of a drone 810 at an in-air position 860 (e.g., in a flight sequence or at the beginning of a landing sequence). The drone 810 is connected to MBSE 820 via a tether 816. The drone 810, the MBSE 820, and the tether 816 may have the same or similar structure and functionality as other drones discussed herein (e.g., drones 300, 610, 710; MBSE 220, 620, 720; tethers 216, 318, 616, 716). As shown in FIGS. 8A-8B, the drone 810 may perform a landing sequence in which it follows a flight pattern 850 and is lowered to a landing position 870.

As shown in FIGS. 8A-8B, the flight pattern 850 may be a zig-zag flight pattern, which lays the tether 816 down in a zig-zag pattern on the ground 840 or landing surface. The zig-zag flight pattern 850 and the zig-zag pattern of the tether 816 may allow the drone to land in a smaller area than other flight patterns, such as flight pattern 650, because the distance between the landing position 870 and the MBSE 820 may be significantly less than the length of the tether 816. For example, the distance between the landing position 870 and the MBSE 820 may be less than half of the length of the tether 816. As shown in FIGS. 8A-8B, in some cases, the zig-zag pattern is a non-overlapping zig-zag pattern in which the tether 816 does not overlap itself when laid down on the ground 840 or landing surface. As noted above, this may prevent or mitigate signal interference or damage to the tether 816.

Figure 9A:
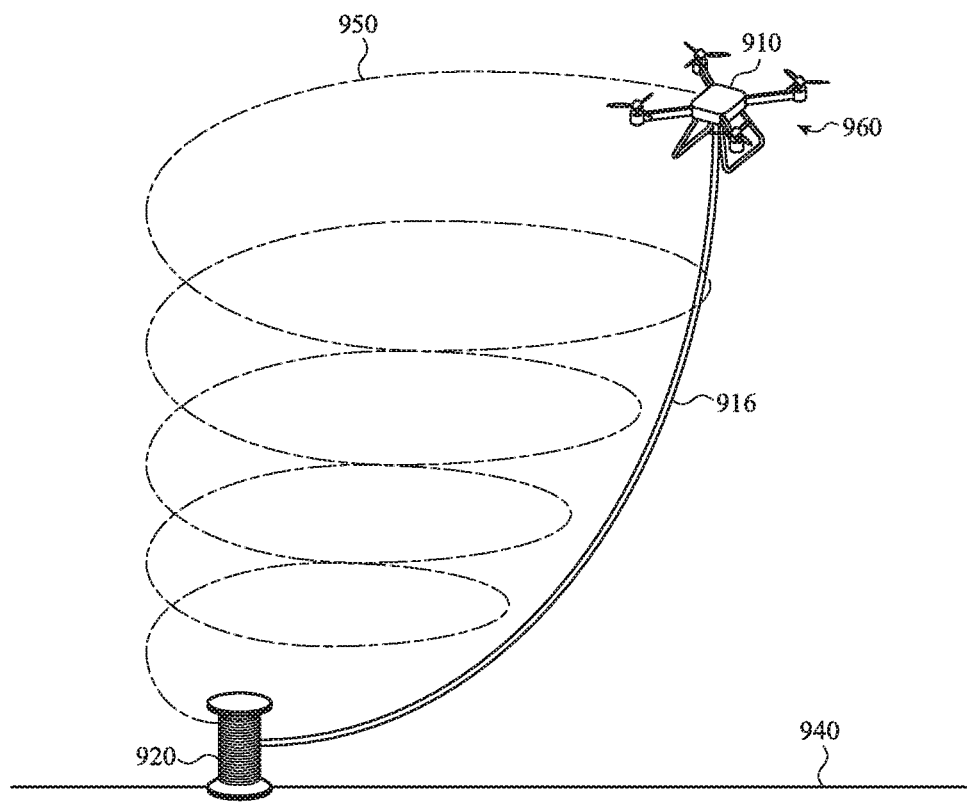
Figure 9B:
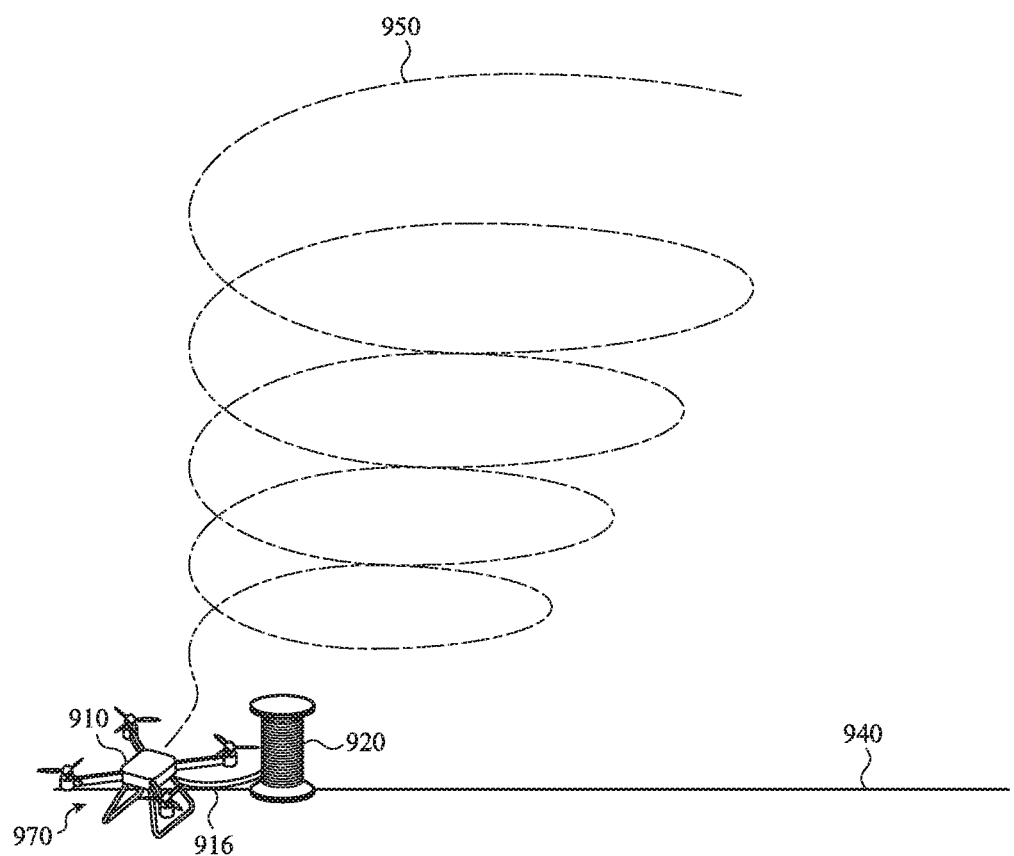

FIG. 9A illustrates a drone 910 at an in-air position 960 (e.g., in a flight sequence or at the beginning of a landing sequence). The drone 910 is connected to MBSE 920 via a tether 916. The drone 910, the MBSE 920, and the tether 916 may have the same or similar structure and functionality as other drones discussed herein (e.g., drones 300, 610, 710, 810; MBSE 220, 620, 720, 820; tethers 216, 318, 616, 716, 816). As shown in FIGS. 9A-9B, the drone 910 may perform a landing sequence in which it follows a flight pattern 950 and is lowered to a landing position 970.

As shown in FIGS. 9A-9B, the MBSE 920 may include a spool around which the tether 916 is wound during the landing sequence. This may prevent or mitigate the drone 910 from contacting the tether 916 and damaging the tether or the drone. In some cases, the spool provides a convenient storage or transportation mechanism for the tether 916 while the drone 910 is not in flight. In some cases, the spool provides a mechanism for varying a length of the tether 916 while the drone 910 is in flight.

In some cases, the flight pattern 950 may be a helical flight pattern, which results in the tether 916 being wound around the spool. The helical flight pattern 950 and the spool may allow the drone to land in a smaller area than other flight patterns, such as flight pattern 650, because the distance between the landing position 970 and the MBSE 920 may be significantly less than the length of the tether 916. For example, the distance between the landing position 970 and the MBSE 920 may be less than half of the length of the tether 916.

In some cases, the spool may be rotatable, and the spool may be rotatable and configured to rotate to reel in the tether 916. The flight pattern of the drone may coordinate movement of the drone with the spool reeling in the tether 916. For example, as the rotatable spool rotates to reel in the tether 916, the drone 910 may gradually move toward the landing position 970. In some cases, the flight pattern synchronizes movement of the drone 910 with the rotatable spool. For example, the drone 910 may move parallel to an axis of rotation (e.g., up and down or laterally) to distribute the tether 916 evenly along the spool.

FIGS. 6A-9B reference landing sequences in which drones are lowered from an in-air position to a landing position. However, the flight patterns discussed with respect to FIGS. 6A-9B may be followed, in reverse, during takeoff sequences to mitigate or avoid signal interference and/or damage to the tether or the drone. The drones following the flight patterns during takeoff and landing sequences discussed with respect to FIGS. 6A-9B may be powered using an on-board power system such as described above with respect to FIGS. 3-5. In some cases, the drones following the flight patterns during takeoff and landing sequences discussed with respect to FIGS. 6A-9B may be powered via air-to-ground power feeds, for example because interference is sufficiently mitigated by the flight patterns.

As noted above, many embodiments described herein reference a drone system. It may be appreciated, however, that this is merely one example; other configurations, implementations, and constructions are contemplated in view of the various principles and methods of operations—and reasonable alternatives thereto—described in reference to the embodiments described above.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A drone, comprising:
    a propulsion system;
    a base station transceiver;
    an on-board power system comprising a battery and configured to receive power over an air-to-ground power feed; and
    an avionics system configured to:
        cause the on-board power system to power the propulsion system using only the battery during a takeoff sequence in which the drone is lifted from a ground position to an in-air position;
        cause the power system to charge the battery using the base power system via the air-to-ground power feed only after the drone is lifted to the in-air position;
        cause the propulsion system to perform a landing sequence in which the drone is lowered to a landing position, the landing sequence including execution of a landing flight pattern that mitigates signal interference between multiple air-to-ground power feeds in a tether connecting the drone to mobile base station equipment, the multiple air-to-ground power feeds including the air-to-ground power feed; and
        cause the on-board power system to power the propulsion system using only the battery during the landing sequence.

2. The drone of claim 1, wherein the landing flight pattern lays the tether on a landing surface in a spiral pattern.

3. The drone of claim 2, wherein the landing flight pattern coordinates movement of the drone with a rotatable spool having a vertical axis around which the tether is wound.

4. The drone of claim 1, wherein the drone is physically connected to the mobile base station equipment by the tether during the takeoff sequence.

5. A drone system, comprising:
a base power system configured to provide power to a drone via at least one air-to-ground power feed in a set of multiple air-to-ground power feeds in a tether connecting the drone to mobile base station equipment; and
a base processing unit communicably coupled to the base power system and the drone and configured to:
cause a propulsion system of the drone to only receive first power from a battery of the drone during a takeoff sequence in which the drone is lifted from a ground position to an in-air position;
cause the propulsion system of the drone to only receive second power from the base power system, via at least one of the air-to-ground power feeds, during a flight sequence;
cause the propulsion system of the drone to perform a landing sequence in which the drone is lowered to a landing position, the landing sequence including execution of a landing flight pattern that mitigates signal interference between the multiple air-to-ground power feeds; and
cause the propulsion system of the drone to only receive power from the battery during the landing sequence.

6. The drone system of claim 5, wherein the base processing unit is further configured to cause the propulsion system to perform the takeoff sequence.

7. A method for operating a tethered drone, comprising:
performing, by a propulsion system of the tethered drone, a takeoff sequence in which the drone is lifted from a ground position to an in-air position while connected to mobile base station equipment via a tether including a set of multiple air-to-ground power feeds;
powering the propulsion system to perform the takeoff sequence using only one or more batteries of the tethered drone;
powering the propulsion system after the takeoff sequence using only a base power system electrically coupled to the drone by at least one air-to-ground power feed in the set of multiple air-to-ground power feeds;
performing, by the propulsion system, a landing sequence in which the drone is lowered to a landing position, the landing sequence including execution of a landing flight pattern that mitigates signal interference within the set of multiple air-to-ground power feeds; and
powering the propulsion system to perform the landing sequence using only the battery.

8. The method of claim 7, wherein the tethered drone is physically connected to the mobile base station equipment by the tether during the takeoff sequence.

9. The method of claim 7, further comprising:
performing a flight sequence after the takeoff sequence; and
powering the propulsion system during the flight sequence using the base power system via the tether.

10. The method of claim 9, further comprising recharging the one or more batteries during the flight sequence using the base power system.

11. The drone of claim 1, wherein the landing flight pattern lays the tether on a landing surface in a zig-zag pattern.

12. The drone system of claim 5, wherein the landing flight pattern lays the tether on a landing surface in a spiral pattern.

13. The drone system of claim 12, wherein the landing flight pattern coordinates movement of the drone with a rotatable spool having a vertical axis around which the tether is wound.

14. The drone system of claim 5, wherein the landing flight pattern lays the tether on a landing surface in a zig-zag pattern.

15. The method of claim 7, wherein the landing flight pattern lays the tether on a landing surface in a spiral pattern.

16. The method of claim 15, wherein the landing flight pattern coordinates movement of the drone with a rotatable spool having a vertical axis around which the tether is wound.

17. The method of claim 7, wherein the landing flight pattern lays the tether on a landing surface in a zig-zag pattern.

* * * * *